United States Patent [19]
Martensson

[11] Patent Number: 5,254,931
[45] Date of Patent: Oct. 19, 1993

[54] BATTERY CHARGING APPARATUS IN A PORTABLE ELECTRONIC APPARATUS

[75] Inventor: Nils E. Martensson, Woking, England

[73] Assignee: Nokia Mobile Phones Ltd., Surrey, England

[21] Appl. No.: 678,720

[22] Filed: Apr. 1, 1991

[30] Foreign Application Priority Data

Apr. 5, 1990 [GB] United Kingdom ............ 9007683

[51] Int. Cl.$^5$ .............................................. H02J 7/04
[52] U.S. Cl. ................................... 320/22; 320/20
[58] Field of Search ............... 320/20, 21, 22, 23, 320/24, 39, 40, 31, 32, 37, 38

[56] References Cited

U.S. PATENT DOCUMENTS

| | | | |
|---|---|---|---|
| 3,609,503 | 9/1971 | Burkett | 320/22 X |
| 4,388,582 | 6/1983 | Saar et al. | 320/20 |
| 4,631,468 | 12/1986 | Satoh | 320/22 X |
| 4,670,703 | 6/1987 | Williams | 320/22 |
| 4,684,870 | 9/1987 | George et al. | 320/20 |
| 4,737,702 | 4/1988 | Koenck | 320/23 X |
| 4,849,682 | 7/1989 | Bauer et al. | 320/15 |
| 4,888,544 | 12/1989 | Terry et al. | 320/22 X |
| 4,918,368 | 4/1990 | Baker et al. | 320/20 X |

FOREIGN PATENT DOCUMENTS

| | | |
|---|---|---|
| 0124739 | 3/1984 | European Pat. Off. . |
| 0326184 | 1/1989 | European Pat. Off. . |
| 0340794 | 5/1989 | European Pat. Off. . |
| 8404212 | 10/1984 | PCT Int'l Appl. . |
| 1298449 | 12/1972 | United Kingdom . |
| 2219151 | 11/1989 | United Kingdom . |

Primary Examiner—Kristine L. Peckman
Attorney, Agent, or Firm—Perman & Green

[57] ABSTRACT

Apparatus for charging a NiCd battery in a portable electronic apparatus, specifically a radio telephone. A charger includes a trickle charge circuit and fast charge circuit which can be selectively enabled by a switch under the control of a signal $V_c$ generated by a voltage generator within the telephone. The charge mode may be selected automatically from within the telephone, e.g. depending on the charge state of the battery as detected by the charge state sensor. Additionally or alternatively the charge mode may be selected manually by depressing appropriate keys on the telephone. Preferably the charge mode is enabled by selecting an appropriate menu which is indicated visually on the display area of the telephone. This charging apparatus facilitates the adoption of a battery charging regime which optimizes battery life.

10 Claims, 2 Drawing Sheets

BATTERY CHARGING APPARATUS IN A PORTABLE ELECTRONIC APPARATUS

This invention relates to apparatus for charging a battery in a portable electronic apparatus.

BACKGROUND OF THE INVENTION

Nowadays, rechargeable batteries, e.g. comprising NiCd cells, are commonplace for powering a large variety of portable electronic apparatus.

By way of example, rechargeable batteries can be used in hand-held cellular radio telephones, so that the subscriber equipment is truly portable. However, particularly because of their transmission capability, portable cellular telephones consume a significant amount of power, necessitating relatively frequent recharging of the batteries.

It is believed that the useful life of a rechargeable battery depends on how it is treated and in particular on the manner in which it is charged under different conditions. In other words, it is possible to optimize the useful operating life of a rechargeable battery by adopting an appropriate charging regime.

U.S. Pat. No. 4,684,870 discloses apparatus for charging a rechargeable battery in a handheld transceiver while maintaining communications capability. The battery charger comprises a dual-mode charging circuit which automatically generates different voltages during receive and transmit modes respectively.

British Patent Application GB-A-2,219,151 discloses a charger for rechargeable batteries which automatically selects between fast, semi-fast and trickle charging depending on the type of battery being charged.

European Patent Application EP-A-0,340,794 discloses apparatus for charging an interchangeable battery pack in a portable radio telephone. The battery pack comprises a switch, the position of which indicates the capacity of the battery pack. The separate charger comprises respective charging circuits for providing two different charging currents, which are selectively connected to the battery in accordance with the identification given by the switch, thus providing optimum charging current for the particular battery type being used.

SUMMARY OF THE INVENTION

According to the present invention there is provided an apparatus for charging a battery in a portable electronic apparatus, comprising means operable in at least two different modes for supplying a charging current to the battery, wherein the portable electronic apparatus is provided with means for selectively enabling the different charging modes, and wherein the enabling means comprises means for selecting an appropriate one of several pre-set operating instructions stored in memory and indicated on visual display means.

Charging apparatus in accordance with the invention offers the versatility of at least two different charge modes which can be selected manually very simply using a menu displayed on visual display means, e.g. on the portable electronic apparatus itself. This apparatus is therefore highly conducive for use within a controlled or organised charging regime, thereby enabling battery life to be optimised.

The charging apparatus in accordance with the present invention is particularly suitable for charging a battery in a portable cellular telephone, which in normal use requires fairly regular recharging.

In a preferred embodiment the means for supplying the charging current are responsive to a variable control signal indicative of the charging mode selected. In particular the control signal may have two discrete levels. The control signal is generated within the portable electronic apparatus itself and may be applied to the supply means e.g. by a hard-wire link.

Suitably, the means for selecting the appropriate menu and thus enabling the different charge modes comprise at least one manually operable key present externally on the portable electronic apparatus. The key(s) need not be dedicated to the charge mode selection function, but preferably are associated with another primary function or functions. For example, in the case of a telephone, the relevant key or keys may be numeric keys ordinarily used for dialing a telephone number. The charge mode function of the key in question may be selected by previously depressing a shift-key, a function-key or a menu-key or some other means of accessing the alternative (subsidiary) function of that key.

The most significant factor of the charging regime which affects battery life is that the battery should ideally be 'conditioned' by subjecting it to a slow, trickle charge on the very first occasion on which it is charged, but on subsequent occasions it may be charged more rapidly. In a preferred embodiment, therefore, it may be arranged that a first charging mode is enabled automatically on the first occasion that a battery is charged, and thereafter a second charging mode is automatically enabled. In this case the first charging mode involves trickle charging or the like, i.e. supplying a continuous low charging current or a higher, pulsed current to achieve an equivalent effect; and the second charging mode involves supplying a rapid charging current to charge the battery more quickly. The second charging mode may have two stages namely a first stage when the battery is charged rapidly and a second stage, specifically when the charge level of the battery exceeds a predetermined level, when the charging rate is reduced to a trickle charge.

The apparatus may be provided with means for monitoring the charge state of the battery and in this case it may be arranged that the slower charge mode is enabled automatically whenever the charge state of the battery falls below a threshold value, but otherwise the faster charge mode is enabled. In any case this automatic selection may be overridden by a facility permitting the user to manually select a desired charging mode.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
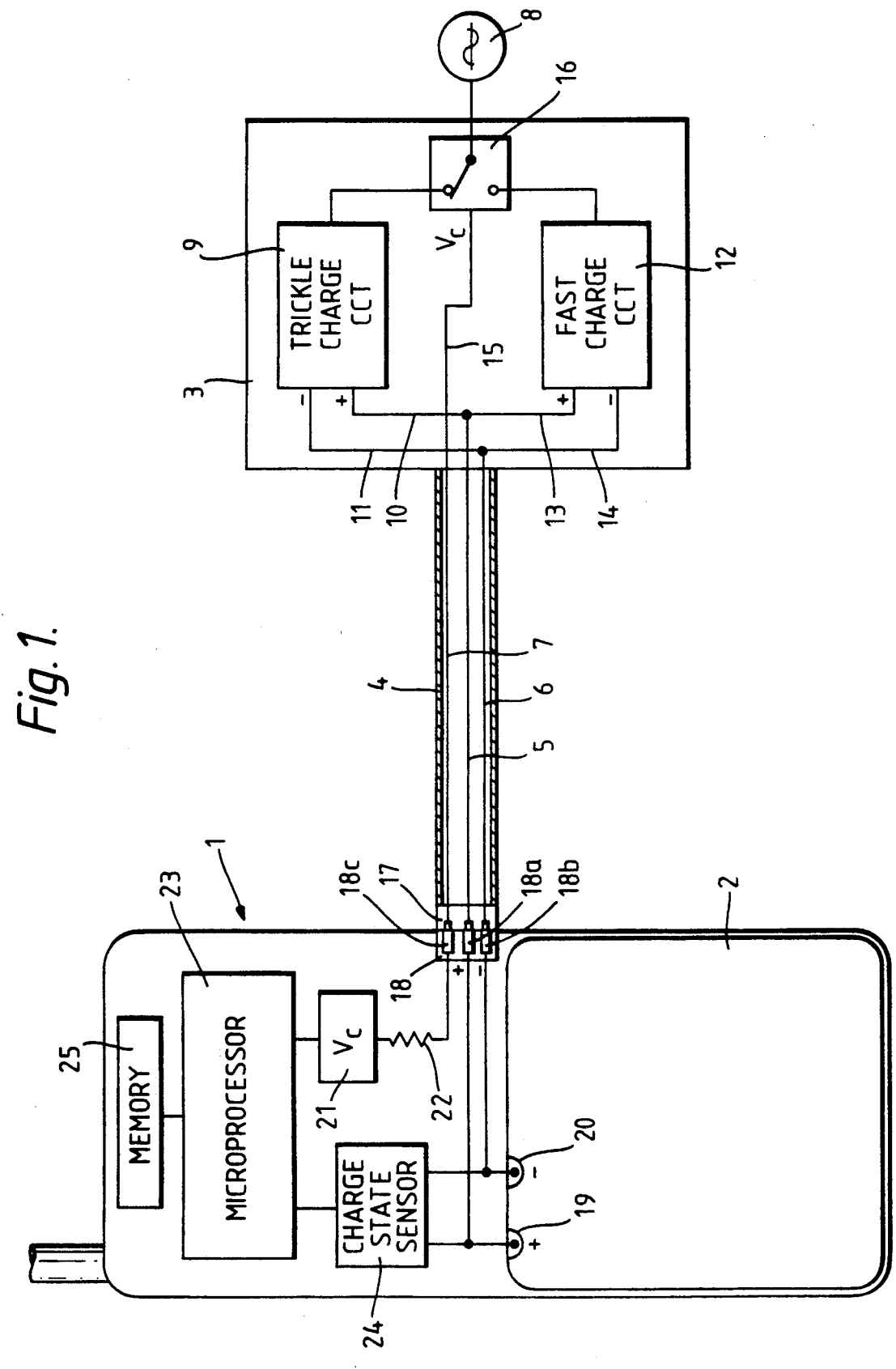
FIG. 1 is a schematic diagram illustrating a battery charging apparatus in accordance with the present invention, for charging a portable cellular telephone.
Figure 2:
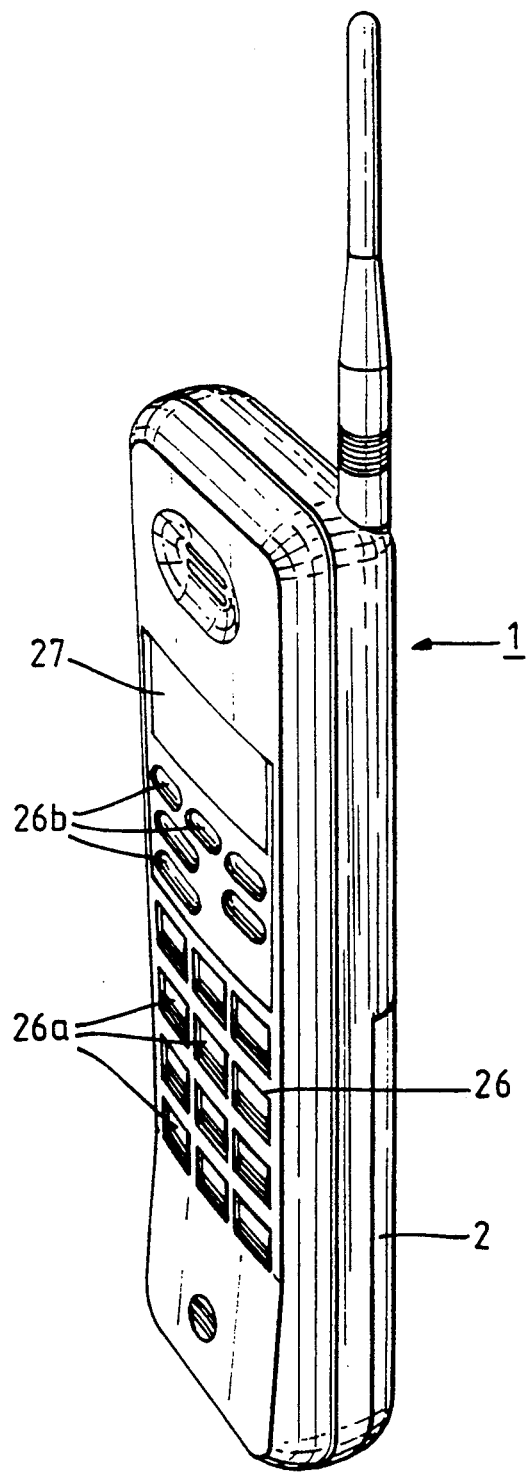
FIG. 2 is a perspective view of the telephone depicted in FIG. 1.

The portable electronic apparatus shown in FIGS. 1 and 2 is a cellular portable telephone 1 comprising a rechargeable battery pack 2. The battery pack may for example contain six series-connected NiCd cells each having a nominal voltage of 1.2 V. The battery pack, therefore, has a nominal voltage of 7.2 V. The capacity of the individual cells is typically 700 mAh.

The telephone 1 also includes a transceiver and all the other features conventionally found in a cellular telephone, but which for the sake of clarity are not shown in the Figures. Also, since these aspects of the telephone are not relevant to the instant invention no further details will be given here, except to say that the circuitry in the telephone is powered by the battery 2.

As shown in FIG. 1, an independent battery charger 3 is connected to the telephone 1 by a three core kink-resistant cable 4. The cable 4 comprises a positive and a negative current carrying wire 5 and 6 respectively and a control line 7, the function of which will be described in more detail below.

The charging apparatus comprises a charger unit 3 having its own separate housing. The charger 3, which is connected to an AC mains supply 8, comprises a trickle charge circuit 9 for delivering a continuous, relatively low direct current, suitably of approximately 100 mA. This current is supplied to the external conductors 5 and 6 of cable 4 via internal conductors 10 and 11 respectively. The charger 3 also includes a fast charge circuit 12 capable of delivering a substantially higher direct current, suitably of approximately 700 mA. This current is supplied to the external conductors 5 and 6 of cable 4 via internal conductors 13 and 14 respectively. A switch 16 enables either the trickle charge circuit 9 or the fast charge circuit 12. The switch 16 operates in response to a control voltage $V_c$ applied thereto on conductor 15 connected to the control line 7 of cable 4. The switch is arranged to enable the trickle charge circuit 9 when a low control voltage, e.g. 0 V is applied on conductor 15, and to enable the fast charge circuit 12 when a high control voltage, e.g. +5 V, appears on conductor 15. As shown, a low voltage is applied on conductor 15 and therefore the trickle charge circuit is enabled.

The cable 4 of the charger 3 terminates in a three-pin plug 17, the three pins thereof being connected to the respective conductors 5, 6 and 7. The plug 17 is connected into a complementary socket 18 provided at a convenient location on the wall, e.g. a side wall, of the telephone 1. The socket terminals 18a and 18b coupled to the positive and negative conductors 5 and 6 are connected internally to the positive and negative terminals 19 and 20 respectively of the battery pack 2. The socket terminal 18c is connected to a control voltage generator 21 via a resistor 22 having a resistance of, for example, 1000 ohms. The control voltage generator 21 is capable of applying a voltage of 0 V or 5 V to terminal 18c of telephone connector 18 and hence to the control line 7 under the control of a microprocessor 23 to which the control voltage generator 21 is coupled. It is noted here that the resistance 22 need not be a discrete element but may be incorporated within the microprocessor 23.

The telephone 1 also comprises a voltage sensor 24 connected across the terminals 19 and 20 of the battery 2 for monitoring the charge state of the battery. The voltage sensor 24 is also coupled to the microprocessor. In practice the voltage sensor 24 may also be incorporated within the microprocessor 23.

Various operating instructions for controlling the telephone may be stored within the microprocessor 23 in conventional manner. A separate memory 25, e.g. an EEPROM, coupled to the microprocessor 23 may be used for storing various menu-driven instructions. One of these instructions (and associated menu) may relate to the selection of the charging rate, i.e. the actuation of switch 16 in the charger 3, as described in more detail below.

In normal operation, i.e. on all but the first charging occasion, the operating instructions are arranged to cause the control voltage generator 21, under the voltage of 5 V which is applied to the control line 7 of the charger cable 4. Thus a 5 V control signal is applied to the switch 16 on conductor 15 whereby the fast charge circuit is enabled. As mentioned above, the fast charge circuit 12 delivers a constant current of approximately 700 mA. However, the sensor 24 in the telephone continually monitors the charge state of the battery 2. When the charge state attains a predetermined level, for example when it is 80% fully charged, the microprocessor 23 causes the control voltage $V_c$ from generator 21 to go low, i.e. to 0 V, whereby the fast charging is terminated and a slow, trickle charge from circuit 9 is enabled instead. In this mode of operation the charger is capable of charging the battery to 80% of maximum capacity in approximately 1 hour and fully charging the battery in about 3 hours, the exact time depending on the initial charge state of the battery prior to recharging.

However, as indicated previously, in order to optimise battery life, the operating instructions may be arranged to cause the control voltage generator 21, under the control of microprocessor 23, to generate a low voltage of 0 V which is applied to the control line 7 of the charger cable 4. Thus a 0 V signal is applied to the switch 16 on conductor 15 whereby the trickle charge circuit 9 is enabled. As mentioned above the trickle charge circuit 9 delivers a constant current of approximately 100 mA. After the initial charge cycle has been completed the telephone 1 would be disconnected from the charger 3 and subsequently whenever the charger 3 was reconnected the system would ordinarily default to the fast charge mode, as discussed above.

However, the Applicant believes that if the battery suffers deep discharge after it has been initially charged, the useful life thereof will be prolonged by trickle charging on the next charging occasion.

To this end the voltage sensor 24 may also be arranged to detect when the battery voltage registers a level less than a predetermined value. In that case a signal is transmitted to the microprocessor 22 which causes the control voltage generated by generator 21 to drop to 0 V, thus enabling the slow charge mode for the duration of the current charging cycle. The system may default back to the fast charging mode for subsequent charging cycles.

In a preferred embodiment implemented by the Applicant, the user is able to manually select the charging mode (and hence override any automatic selection) using the keypad 26 on the front of the telephone (see FIG. 2). The keypad 26 essentially comprises two main sets of keys, namely alpha-numeric keys 26a associated with alpha-numeric data for dialling telephone numbers and entering alphanumeric data into the telephone memories, e.g. a subscriber number index; and a set of function keys 26b for enabling various predetermined functions, for example these keys 26b include a "SEND" and "END" key for respectively initiating and terminating a telephone call. One of the function keys may be a menu or function key labelled, for example "MENU" or "FUNCTION" or with a suitable abbreviation thereof. Depression of this key enables a variety of pre-set menus, the related instructions of which are stored in the memory 25, to be viewed and selectively enabled. The various menus are selected by depressing the appropriate alphanumeric keys after depressing the "MENU" or "FUNCTION" key. The relevant menu is shown to the user in words or abbreviations on the display panel 27. For example, the user may be able to select the ringing tone by appropriate menu selection.

More sophisticated options may also be available via the menu facility. For example, the user may be able to enable the so-called Discontinuous Transmission mode which employs a voice activated switch which helps to reduce battery drain by transmitting only when speech is input to the microphone.

In accordance with the present invention a special menu is provided to permit manual enabling of either the fast or slow charge modes. Any predetermined sequence of keystrokes may be employed to select the respective menu which may display a legend such as "Fast Charge Active" or "Slow Charge Active" on the display panel 27. The alternative mode may be enabled simply by depressing another predetermined key of the alphanumeric key set 26a. Suitably the menu mode may be exited by pressing the "END" key of function key set 26b.

It will now be evident that the menu selection facility causes a particular instruction to be enabled, whereby the control voltage generator 21 generates an appropriate voltage under the control of microprocessor 23 to enable the corresponding charge mode, as discussed above.

When the menu-driven charge mode selection facility is provided it is not necessary for the telephone to be provided with automatic charge mode change-over. In this case the telephone may be supplied to the user with the slow charge mode enabled. The user then has the option of manually enabling the fast charge mode from the keypad on the telephone once the initial charging cycle has been completed. Thereafter the user may manually select the slow charge mode whenever it is desired to charge a new replacement battery which has not been charged before, or to recharge an existing battery which is suffering deep discharge. Alternatively, the telephone may be supplied to the user with the fast charge mode enabled. The user now has the option of manually enabling the slow charge mode from the keypad, particularly intended for the initial charge cycle. Once the initial charge cycle has been completed the user can manually reset the fast charge mode.

In view of the foregoing description it will be evident to a person skilled in the art that various modifications may be made within the scope of the invention. For example, rather than employing two separate circuits 9 and 12 for slow and fast charge as depicted herein, a common circuit may be employed in which the current output is varied in accordance with the control voltage $V_c$. Moreover, instead of using a constant low current, the trickle charge mode may be effected by pulsing a high current. Thus, for example, a 700 mA source may be pulsed on for 10% of the time and off for 90% of the time to achieve a trickle charge effect similar to the 100 mA constant source mentioned above. Furthermore, the battery charger 3 need not be a separate unit but may be incorporated within the telephone. However, in the case where the charger is a distinct unit, the memory in which the operating instructions associated with the menu functions are stored and/or the visual display may be incorporated in the charger unit, although the user would still select the appropriate charging mode using the keys on the telephone itself. Finally, it is noted that the invention is suitable for charging portable electronic apparatuses other than cellular telephone.

I claim:

1. A system for charging a battery in a portable electronic apparatus, the portable electronic apparatus comprising visual display means, the system comprising:
   means operable in at least two different modes for supplying a charging current to the battery,
   wherein the portable electronic apparatus is provided with means, operably connectable to the means for supplying a charging current, for selectively enabling the different charging modes,
   said enabling means comprising means for enabling a user to select an appropriate one of several pre-set operating instructions stored in memory and indicated on said visual display means.

2. A system as claimed in claim 1, wherein the enabling means comprise means for generating a control signal indicative of the selected charging mode, and the charging current supply means are responsive to said control signal to operate in the selected charging mode in accordance with said control signal.

3. A system as claimed in claim 1, wherein the portable electronic apparatus comprises a housing, and the enabling means comprise at least one manually operable key present externally on the housing.

4. A system as claimed in claim 3, wherein the at least one key is operable to enable at least one alternative function.

5. A system as claimed in claim 1, including means for sensing the charge state of the battery, the enabling means being responsive to said sensing means to enable a first or a second charging mode depending on the sensed state.

6. A system as claimed in claim 5, wherein the enabling means are conditioned to enable the first charging mode when the charge state of the battery is below a predetermined value.

7. A system as claimed in claim 5, wherein the first charging mode involves supplying a trickle charging current, and the second charging mode involves supplying a rapid charging current.

8. A system as claimed in claim 7, wherein the second charging mode involves initially supplying the rapid charging current and subsequently supplying the trickle charging current.

9. A system as claimed in claim 1, wherein the means for supplying a charging current to the battery comprises a housing separate from the portable electronic apparatus.

10. A system as claimed in claim 1, wherein the portable electronic apparatus is a radio telephone and the system comprises means for making a disconnectable electrical connection between the radio telephone and the means for supplying a charging current.

* * * * *